United States Patent

Kropp

[11] Patent Number: 5,902,997
[45] Date of Patent: May 11, 1999

[54] DEVICE FOR SPACING AT LEAST ONE LENS FROM AN OPTOELECTRONIC COMPONENT

[75] Inventor: Jörg-Reinhardt Kropp, Berlin, Germany

[73] Assignee: Siemens Aktiengesellschaft, Munich, Germany

[21] Appl. No.: 08/754,071

[22] Filed: Nov. 20, 1996

Related U.S. Application Data

[63] Continuation of application No. PCT/DE95/00625, May 9, 1995.

[30] Foreign Application Priority Data

May 20, 1994 [DE] Germany ............................ 44 18 477

[51] Int. Cl.[6] ............................. H01L 27/146; G02B 6/42
[52] U.S. Cl. ........................ 250/216; 250/208.1; 359/619
[58] Field of Search ................ 250/216, 208.1, 250/208.2; 359/618, 619, 620, 621, 622, 623, 624; 385/89

[56] References Cited

U.S. PATENT DOCUMENTS

| | | |
|---|---|---|
| 4,528,446 | 7/1985 | Dunaway et al. ........................ 250/216 |
| 4,767,172 | 8/1988 | Nichols et al. . |
| 4,994,664 | 2/1991 | Veldkamp ................................ 250/216 |
| 5,040,868 | 8/1991 | Waitl et al. . |
| 5,260,587 | 11/1993 | Sato ........................................... 257/88 |
| 5,359,190 | 10/1994 | O'Regan et al. ........................ 250/216 |
| 5,424,531 | 6/1995 | O'Regan et al. ........................ 250/216 |
| 5,737,466 | 4/1998 | Honsberg et al. ........................ 385/89 |

FOREIGN PATENT DOCUMENTS

| | | |
|---|---|---|
| 0 117 606 | 9/1984 | European Pat. Off. . |
| 0 400 1976 | 12/1990 | European Pat. Off. . |
| 0 421 118 | 4/1991 | European Pat. Off. . |
| 0 506 438 | 9/1992 | European Pat. Off. . |
| 0 529 947 | 3/1993 | European Pat. Off. . |
| 25 10 267 | 9/1975 | Germany . |
| 43 42 844 | 12/1993 | Germany . |
| 0322787 | 11/1993 | WIPO .................................... 250/216 |
| 9322788 | 11/1993 | WIPO .................................... 250/216 |

*Primary Examiner*—Edward P. Westin
*Assistant Examiner*—John R. Lee
*Attorney, Agent, or Firm*—Herbert L. Lerner; Laurence A. Greenberg

[57] ABSTRACT

An optoelectronic unit includes a base plate, an optoelectronic component carried by the base plate and having at least one optically active zone, and a lens body having at least one lens associated with the at least one optically active zone. The lens body has an integral spacing device resting directly against the optoelectronic component for establishing a desired clearance distance between the at least one optically active zone and the at least one lens.

10 Claims, 2 Drawing Sheets

DEVICE FOR SPACING AT LEAST ONE LENS FROM AN OPTOELECTRONIC COMPONENT

CROSS-REFERENCE TO RELATED APPLICATION

This application is a Continuation of International Application Serial No. PCT/DE95/00625, filed May 9, 1995.

BACKGROUND OF THE INVENTION

Field of the Invention

The invention relates to an optoelectronic unit, having a base plate which carries an optoelectronic component with at least one optically active zone, a lens body having at least one lens associated with the optically active zone, and a spacing device being an integral component of the lens body.

In the production of optoelectronic units or modules, the precise optical coupling of the optically active zone of the optoelectronic component (such as a laser diode) to some further optical element (such as a fiber-optical waveguide) is problematic, especially if a plurality of optically active zones (such as a diode array) are to be coupled.

Published European Patent Application 0 506 438 A1, corresponding to U.S. Pat. No. 5,260,587, discloses a unit with an optoelectronic component in the form of a so-called LED array with a plurality of light-emitting diodes spaced apart in a line as the optically active zones and with a lens carrier which carries a number of individual lenses (lens array) corresponding in number and spacing to the diodes. The assembly and adjustment of the known unit is comparatively complicated and expensive, because of the lack of adjusting devices on the unit itself.

For the sake of easier assembly, Published European Patent Application 0 421 118 A1 describes a carrier body for a glassed-in lens that is fixed relative to a body which carries a laser diode. To that end, one flat side of the carrier body, after being adjusted, can be soldered to metallized small glass blocks that are secured to both sides of the body which carries the laser diode.

German Published, Non-Prosecuted Patent Application DE 43 42 844 A1, corresponding to U.S. application Ser. No. 08/661,076, filed Jun. 10, 1996, discloses a carrier that jointly carries an optoelectronic component with a laser diode array, and lenses that have to be positioned and fixed individually. Additional, separate lenses can be inserted into indentations in the carrier and form a mechanical stop for the component.

An optoelectronic unit which is known from Published European Patent Application 0 529 947 A1 includes as its first part a base plate (termination plate) which has a solder-coated contact spot for at least one optoelectronic component with an optically active zone, and reference points in the form of first alignment indentations. A component placed on the contact spot is automatically exactly positioned relative to the contact spot and therefore to the alignment indentations, upon reflux of the solder, utilizing the surface tension of the solder. An optical fiber to be coupled extends in a groove of a second plate and ends at the end region toward the base plate. An indentation is provided in the end region, preceding the end of the optical fiber, and a separate spherical lens can be inserted into it. Further alignment indentations are formed in the end region, cooperating with the first alignment indentations and forming receptacle spaces. Separate alignment balls can be inserted into the receptacle spaces and provide for positioning and mutual alignment of the two plates in the XYZ directions. The positioning of the optical fiber in the Z direction (axial direction) and the adjustment and positioning of the lens are not described in further detail and must be carried out separately. The known unit has comparatively many individual parts that must each be manufactured precisely, that involve tolerance and that have to be manipulated individually.

Published European Patent Application 0 117 606 A1, corresponding to U.S. Pat. No. 4,767,172, describes a collector for a light-emitting diode row in which each light-emitting diode is assigned a central lens with a concentric parabolic mirror surface, in order to shape light emitted by the light-emitting diode into a parallel beam. The collector is braced through a spacing device on a base plate that carries the individual light-emitting diodes. Therefore the conditions of coupling and beam formation depend not only on the structural height of the light-emitting diodes but also on the tolerances of the seam heights between the light-emitting diodes and the base plate on one hand, and the spacing device and the base plate on the other hand. In the described use of the collector in an electrophotographic recording device, such tolerances are acceptable. However, when light is coupled into an optical fiber, for instance, tolerances that are lower by at least one order of magnitude must be assured.

German Published, Non-Prosecuted Patent Application DE 38 30 119 A1 describes a unit of the type referred to at the outset, in which an optoelectronic component in the form of a laser chip with at least one optically active zone is fixed on a base plate. A lens body has a plane side surface toward the zone and an opposite, convex side surface having a curvature which serves as an aspherical lens. The region between the curvature and the plane side surface necessarily dictates a considerable spacing between the laser and the convex side surface acting as a lens, and that spacing is disadvantageous to the coupling efficiency. Moreover, a material that serves to prevent reflections has to be disposed between the plane side surface and the laser. The laser mirror surface can become stressed and damaged from contact with that material, particularly when there are frequent temperature change cycles.

SUMMARY OF THE INVENTION

It is accordingly an object of the invention to provide an optoelectronic unit, which overcomes the hereinafore-mentioned disadvantages of the heretofore-known devices of this general type, which is technically simple, which requires a minimal adjustment effort and expense, which has very high coupling efficiency and which in particular has a plurality of cooperating optically active zones and lenses.

With the foregoing and other objects in view there is provided, in accordance with the invention, an optoelectronic unit, comprising a base plate; an optoelectronic component carried by the base plate and having at least one optically active zone; and a lens body having at least one lens associated with the at least one optically active zone, the lens body having an integral spacing device resting directly against the optoelectronic component for establishing a desired clearance distance between the at least one optically active zone and the at least one lens.

The unit according to the invention makes do with a considerably reduced number of individual parts that have to be manipulated and joined, since the spacing device is an integral component of the lens body. Merely by precise lens body production, the incident tolerances, which determine the optical quality of the unit with respect to the spacing between the optically active zone or zones and the lens or lenses, are advantageously reduced considerably. The unit according to the invention can moreover advantageously dispense with an additional part as a carrier for the lens body. A further advantage of the invention is that the surface structuring (alignment aids) of the base plate and precise positioning of the optoelectronic component with regard to the alignment aids, which are necessary in Published European Patent Application 0 529 947 A1, are not needed.

In accordance with another feature of the invention, the spacing device is in the form of studlike protuberances, having a height which is dimensioned in accordance with the desired spacing between the optically active zone and the lens.

In accordance with a further feature of the invention, the protuberances are lenticular in shape, so that in each case exact contact or stop points are defined.

In accordance with an added feature of the invention, the spacing device is in the form of protuberances in the lens body material, which is a preferred improvement from a production standpoint.

In accordance with an additional feature of the invention, the highest points of the protuberances are located in the same plane as the optical axis of the lens. As a result, the contact regions between the protuberances and the component are adequately spaced apart from the foot region of the component, so that there is enough free space for residues of joining media (such as adhesive or solder) below the protuberances. If the optically active zone is located on the upper long edge of the component, then the above-described embodiment of the invention assures precise spacing adjustment even if the component has been separated by being broken apart at rated breaking points. In that case, defective or irregular breakage surfaces running from the rated braking point to the foot region do not have a disruptive effect.

In accordance with yet another feature of the invention, the lens body is fixed on the base plate and is dimensioned in its height in such a way that the lens is aimed at the height of the optically active zone. This provides a further reduction in the number of degrees of freedom and therefore in the effort and expense for adjustment.

In accordance with yet a further feature of the invention, in an optoelectronic component with a plurality of optically active zones disposed in one row and with a lens body with a corresponding number of lenses disposed in a row, the spacing device is disposed in line with the lenses.

In accordance with yet an added feature of the invention, wherein the optoelectronic component has a plurality of optically active zones (surface-active two-dimensional array) disposed in a plane, and the lens body has a corresponding array of associated lenses (two-dimensional lens array), at least three defined bearing regions for the spacing device are provided on the surface of the optoelectronic component.

In accordance with a concomitant feature of the invention, the bearing regions are surrounded by annular, preferably raised, markings. This provides especially precise, easily assembled positioning of the lens body.

Other features which are considered as characteristic for the invention are set forth in the appended claims.

Although the invention is illustrated and described herein as embodied in an optoelectronic unit, it is nevertheless not intended to be limited to the details shown, since various modifications and structural changes may be made therein without departing from the spirit of the invention and within the scope and range of equivalents of the claims.

The construction and method of operation of the invention, however, together with additional objects and advantages thereof will be best understood from the following description of specific embodiments when read in connection with the accompanying drawings.

BRIEF DESCRIPTION OF THE DRAWINGS

FIGS. 1 and 2 are respective diagrammatic, plan and sectional views of a first exemplary embodiment of the invention, wherein FIG. 2 is taken along a line II—II of FIG. 1, in the direction of the arrows; and FIGS. 3 and 4 are respective plan and sectional views of a further exemplary embodiment of the invention, wherein FIG. 4 is taken along a line IV—IV of FIG. 3, in the direction of the arrows.

DESCRIPTION OF THE PREFERRED EMBODIMENTS

Figure 2:
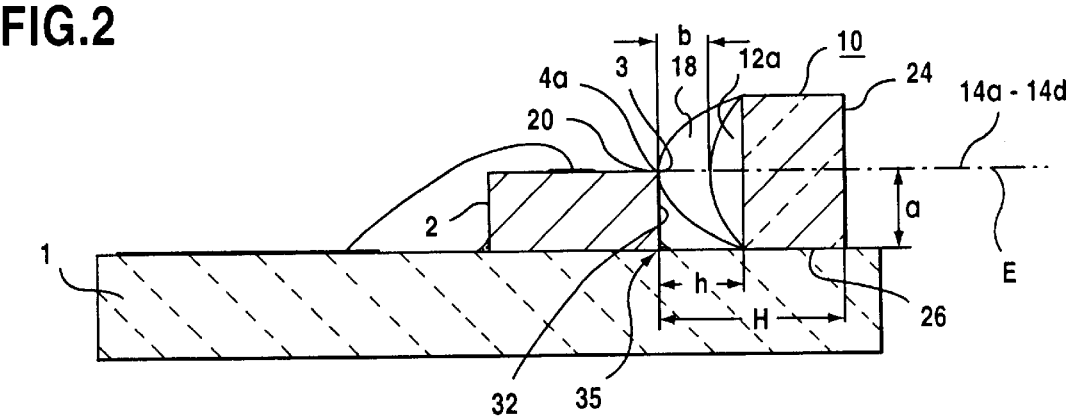
Figure 1:
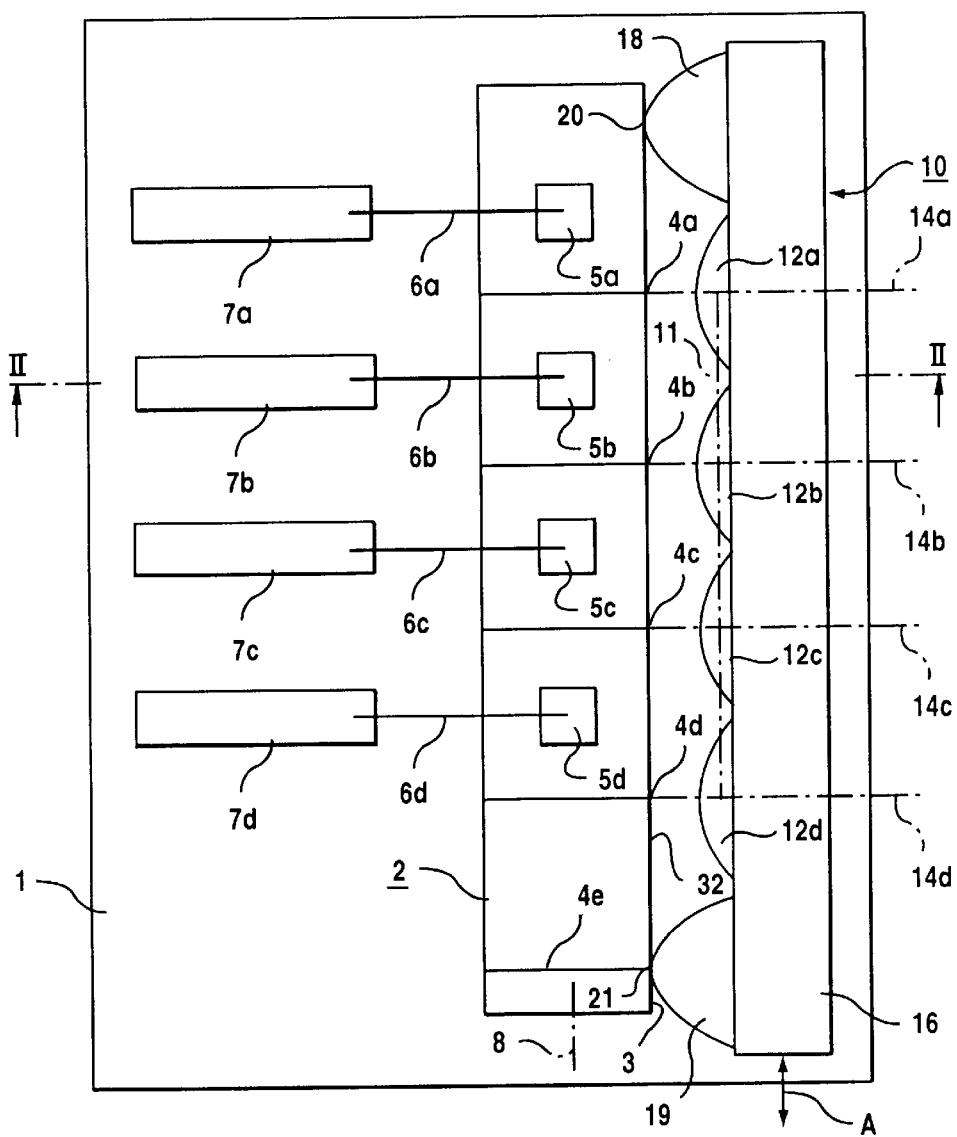

Referring now to the figures of the drawings in detail and first, particularly, to FIGS. 1 and 2 thereof, there is seen a unit that includes a ceramic base plate 1 which carries an optoelectronic component 2. The component 2 has a front edge 3 with many optically active zones 4a, 4b, 4c, 4d, 4e, constructed as laser diodes (laser diode array), which in fact can be seen as horizontal lines when suitably enlarged, because of their structuring. The laser diodes are connected by non-illustrated lower surface contacting of the component 2 and by individual contact spots 5a–5d and bonding wires 6a–6d to conductor tracks 7a–7d for individual triggering and are aligned in one row 8. The optically active zone 4e is not contacted.

A lens body 10 which is formed in one piece from an elongated strip of glass has a number of refractive or diffractive lenses 12a–12d that are disposed in a row 11 and correspond in number to the number of contacted optically active zones 4a–4d. The lenses each have respective optical axes 14a–14d. The lens body 10 is constructed in one piece and formed of lens body material 16. The lens body material 16 is recessed in line with the row 11 of the lenses 12a–12d, forming studlike protuberances 18, 19. Each of the protuberances 18, 19 has a highest point 20, 21 located in the same plane E with the optical axes 14a–14d of the lenses. Heights H or h of the protuberances relative to a back side 24 of the lens body 10 or to the lenses 12a–12d, are dimensioned in such a way that a spacing of the highest points 20, 21 from the highest points of the lenses 12a–12d corresponds to a desired spacing b between the optically active zones 4a–4d and the lenses 12a–12d. The lens body 10 has a lower surface 26 that is fixed to the base plate 1 as well. The optical axes 14a–14d of the lenses 12a–12d have a height a relative to the base plate 2 which is dimensioned in such a way that the optical axes 14a–14d are aligned with the optically active zones 4a, as is seen in FIG. 2.

Since the protuberances 18, 19 each directly strike a side surface 32 of the optoelectronic component 2 with their highest points 20, 21, a comparatively little-tolerance-affected adjustment of the spacing b between the zone 4a and the lens 12a is assured. The contact between the protuberances and the component takes place at the edge 3 of the component 2, so that a lower foot region 35 of the component 2 may have adhesive and/or solder residues without impairing the spacing adjustment.

The assembly of the unit is carried out by first mounting the component 2 on the base plate 1. After electrical contacting of the contact spots 5a–5d, the lens carrier 10 is put in place in such a way that the highest points 20, 21 of the protuberances 18, 19 rest on the component 2, and the lens carrier 10 rests with its lower surface 26 smoothly on the surface of the base plate. Thus the height a of the lens, the axial spacing b, and all of the angular positions are defined. The only still-existing degree of freedom is in the direction of an arrow A and can be defined passively, that is without operating the optoelectronic component. To that end, this purpose is especially advantageously served by the strip of the optically active zone 4e, relative to which the highest point 21 of the protuberance 19 can be aligned comparatively easily. The fixation of the lens carrier can be carried out by adhesive bonding or soldering. In the case of soldering, the soldering surfaces may be coated with a solderable metal that can be applied in structured fashion by planar methods.

Figure 4:
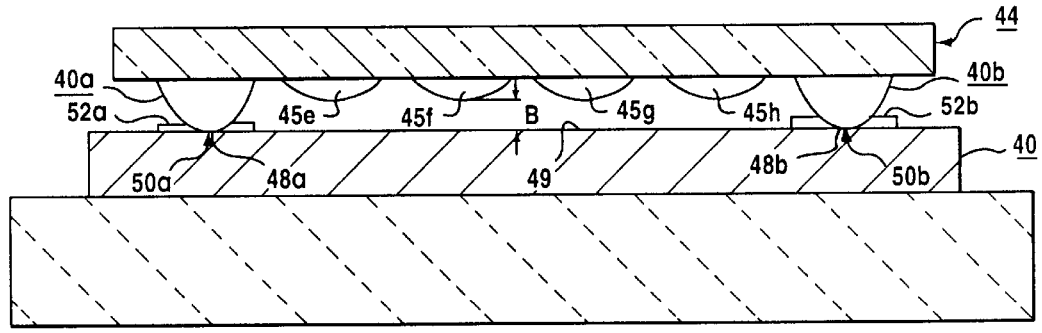
Figure 3:
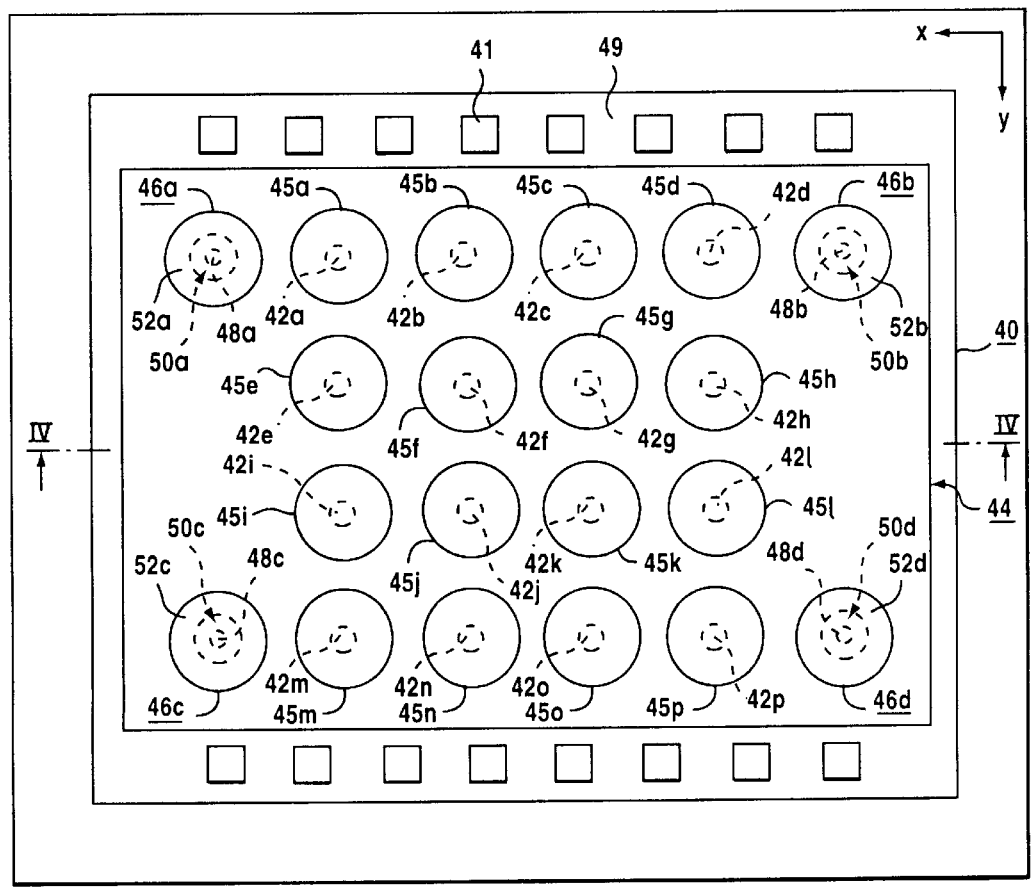

FIGS. 3 and 4 show a further exemplary embodiment of an optoelectronic unit with an optoelectronic component 40 having contact spots 41 for individual electrical contacting of light-sensitive optically active zones 42a–42p, which are constructed as a two-dimensional (X–Y) 4*4 matrix of a surface-active photodiode array. A lens body 44 which is provided parallel to the X–Y plane of the optically active zones 42a–42p has a corresponding two-dimensional configuration of lenses 45a–45p in a 4*4 matrix (lens array). In every corner of the lens body 44, a studlike protuberance 46a–46d is provided as a spacing device. Each protuberance has a defined bearing region 48a–48d on a surface 49 of the component 40. The protuberances 46a–46d may preferably be constructed to be lenticular in shape, resulting in essentially point-type contacts with the bearing regions 48a–48d. As already explained in detail in conjunction with the first exemplary embodiment, the height or the respective highest points (highest points 50a and 50b of the protuberances 46a and 46b can be seen in FIG. 4) are dimensioned in accordance with a desired spacing B between the respective optically active zone (such as 42f) and the lens associated therewith (such as 45f). The bearing regions 48a–48d are each surrounded by annular markings 52a–52d. The markings rise above the surface 49 of the component 40 and serve both as a positional marking for the positioning of the studlike protuberances 48a–48d during assembly and for automatic positional fixation. To that end, the height of the markings is chosen in such a way that the protuberances lock in place in them. The lens carrier can be fixed in that position, for instance by adhesive bonding. An alternative fixation method is metallizing of the protuberances, through the use of which the lens body 44 can be soldered to the component 40. Given exact positioning of the markings, in this embodiment of the invention, adjustment can be dispensed with entirely.

The lens carrier can be formed of glass or silicon. In addition to planar structuring methods combined with etching techniques, lens carriers can also be manufactured in one piece of glass, in the form of pressed-glass parts.

I claim:

1. An optoelectronic unit, comprising:

a base plate;

an optoelectronic component carried by said base plate and having a length, a substantially flat surface extending entirely along said length and at least one optically active zone; and a lens body having at least one lens associated with said at least one optically active zone, said lens body having an integral spacing device resting directly against said substantially flat surface of said optoelectronic component for establishing a desired clearance distance between said at least one optically active zone and said at least one lens.

2. The unit according to claim 1, wherein said spacing device includes studlike protuberances having a height dimensioned in accordance with said desired spacing between said at least one optically active zone and said at least one lens.

3. The unit according to claim 2, wherein said protuberances are lenticular.

4. The unit according to claim 2, wherein said at least one lens has an optical axis in a given plane, and each of said protuberances has its highest point in said given plane.

5. The unit according to claim 1, wherein said lens body is formed of a material, and said spacing device includes protuberances formed in said material.

6. The unit according to claim 1, wherein said at least one optically active zone has a given height, and said lens body is fixed on said base plate and has a height causing said at least one lens to be aimed at said given height.

7. The unit according to claim 1, wherein said at least one optically active zone is a given number of optically active zones disposed in a row, said at least one lens of said lens body is at least said given number of lenses disposed in a row, and said spacing device is disposed in line with said lenses.

8. The unit according to claim 1, wherein said optoelectronic component has a multiplicity of optically active zones arranged in an array having a common plane;

said lens body has a multiplicity of lenses arranged in an array corresponding to said array of said multiplicity of optically active zones; and said surface of said optoelectronic component has at least three defined bearing regions thereon for bearing said spacing device.

9. The unit according to claim 8, including annular markings surrounding said bearing regions.

10. The unit according to claim 9, wherein said markings are raised.

* * * * *